3,743,664
PROCESS FOR PREPARING ORGANIC ISOCYANATES

Nicholas B. Franco, Brookfield, Conn., and Martin A. Robinson, Flushing, N.Y., assignors to Olin Corporation, New Haven, Conn.
No Drawing. Filed Aug. 24, 1971, Ser. No. 174,530
Int. Cl. C07c 119/04
U.S. Cl. 260—453 PC            10 Claims

ABSTRACT OF THE DISCLOSURE

A process for preparing an organic isocyanate which comprises reacting an organic nitro compound with carbon monoxide in the presence of a catalytic proportion of a noble metal isocyanide complex.

---

This invention relates to the preparation of organic isocyanates by reacting an organic nitro compound with carbon monoxide in the presence of a noble metal isocyanide complex catalyst.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For examples, Belgium Pat. No. 672,405 entitled, "Process for the Preparation of Organic Isocyanates," describes the use of a catalyst system of a noble metal and/or a Lewis acid in the reaction between an organic nitro compound and carbon monoxide.

Unfortunately, the yield of organic isocyanates afforded by these simplified techniques has not been significant enough to justify their use on a commercial scale.

It is a primary object of this invention to provide an improved process for the preparation of organic isocyanates.

Another object of the invention is to provide a novel catalyst complex useful in the direct conversion of organic nitro compounds to the corresponding organic isocyanates.

Still a further object is to provide an improved process for preparing aromatic isocyanates such as phenyl isocyanate, toluene diisocyanate, and isocyanato-nitrotoluenes.

These and other objects of the invention will be apparent from the following detailed description thereof.

It has now been found that the above-mentioned objects are accomplished when an organic nitro compound is reacted with carbon monoxide at an elevated temperature and elevated pressure in the presence of a catalytic proportion of a noble metal isocyanide complex.

More particularly, the noble metal isocyanide complex has the formula:

$$A(CN\text{—}R)_y Z_w$$

(I)

where A is a noble metal selected from the group consisting of palladium, rhodium, ruthenium, platinum, osmium, iridium, rhenium, silver and gold with the metals of the platinum series i.e. palladium, rhodium, ruthenium, platinum, osmium and iridium being preferred; R is a hydrocarbon group and more particularly an alkyl or aryl group having from 1 to 14 and preferably from 1 to 10 carbon atoms; Z is an anion of an inorganic or organic acid or salt and more particularly is a halide or pseudo-halide selected from the group consisting of chloride, bromide, iodide, fluoride, $ClO_4^-$, $NCS^-$, $SCN^-$, $CN^-$, $NCO^-$, $OCN^-$ and $CNO^-$ and mixtures thereof with the halides and $ClO_4^-$ being preferred and more preferably chloride and bromide; $y$ is an integer of 1 to 6, preferably 1 to 4 and $w$ is an integer of 1 to 8, preferably 1 to 4. In the above complex Formula I, the R group may contain innocuous substituents such as halogen and most preferably will be an aryl group containing from 6 to 10 carbon atoms. The value of $y$ and $w$ in the above Formula I will depend on the oxidation state of the selected noble metal.

The above-noted complexes (I) may generally be prepared by reacting a noble metal compound such as hydrated rhodium trichloride with an isocyanide compound such as p-chlorophenyl isocyanide at an elevated temperature in an alcoholic solution (ethanol). The method of preparation of these complexes (I) is further disclosed in detail in "Isocyanide Complexes of Metals" by L. Malatesta found in Progress in Inorganic Chemistry, vol. 1, p. 283 (1959) and in an article by M. Angoletta in Ann. Chim. (Rome), 45, 970 (1955).

The following compounds are exemplary of the complexes (I) which may be used in this invention:

$Pd(CNC_6H_5)_2I_2$
$Pd(CNC_6H_4CH_3)_2Cl_2$
$Rh(CNC_6H_5)_4Cl_3$
$Rh(CNC_6H_4CH_3)_2Cl_2$
$Rh(CNC_6H_4CH_3)_4(ClO_4)$
$Rh(CNC_6H_5)_4(ClO_4)$
$Rh(CNC_6H_4CH_3)_4(Cl_2)(ClO_4)$
$Ru(CNCH_3)_4Cl_2$
$Ru(CNCH_3)_4Br_2$
$Ru(CNC_2H_5)_4Br_2$
$Ru(CNC_6H_4CH_3)_4I_2$
$Pt(CNCH_3)_2Cl_2$
$Pt(CNCH_3)_2(CN)_2$
$Pt(CNC_6H_5)Cl_2$
$Ag(CNC_2H_5)CN$
$Ag(CNC_6H_4CH_3)_4(ClO_4)$
$Au(CNC_6H_5)Cl$
$Au(CNC_6H_5)_4Cl$

The above list is merely exemplary of the many complexes which may be used in the method of this invention and is not intended as an exclusive listing. Further complexes of the Formula I may be found in "Isocyanide Complexes of Metals" by L. Malatesta found in Progress in Inorganic Chemistry, vol. 1, p. 283 (1959).

The catalyst complex can be self-supported or deposited on a support or carrier for dispersing the catalyst complex to increase its effective surface. Alumina, silica, carbon, barium sulfate, calcium carbonate, asbestos, bentonite, diatomaceous earth, fuller's earth, and analogous materials are useful as carriers for this purpose.

Any organic nitro compound capable of being converted to an organic isocyanate may be employed as a reactant. Generally, aromatic, cycloaliphatic, and aliphatic mono- or polynitro compounds, which may be substituted, if desired, can be reacted to form the corresponding mono- or poly-isocyanates by the novel process of this invention. The term "organic nitro compound," as used throughout the description and claims to define unsubstituted as well as substituted organic nitro compounds of the type described herein. Typical examples of suitable organic nitro compounds which can be reacted to form isocyanates include the following:

(I) AROMATIC NITRO COMPOUNDS (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) NITROCYCLOALKANES (a) Nitrocyclobutane
(b) Nitrocyclopentane
(c) Nitrocyclohexane
(d) Dinitrocyclohexanes
(e) Bis(nitrocyclohexyl)methanes (III) NITROALKANES (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) $\alpha,\alpha'$-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-Chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-Chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) $\alpha,\alpha$-Dibromo-p-nitrotoluene
(42) $\alpha$-Bromo-p-nitrobenzene
(43) 1-fluoro-4-nitrobenzene
(44) 1-fluoro-2,4-dinitrobenzene
(45) 1-fluoro-2-dinitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represent those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including the various nitrated toluenes and the nitrated xylenes; nitrated biphenyl and nitrated diphenylmethylene. Other preferred reactants include bis(nitrophenoxy) alkylenes and bis(nitrophenoxy) alkyl ethers. Generally, the organic nitro compounds and substituted organic nitro compounds contain from 1 to 20 carbon atoms. Preferably the organic nitro compound will be an aromatic nitro compound containing from 6 to 20 and more preferably from 6 to 14 carbon atoms.

The reaction is carried out in the presence of a catalytic proportion of the catalyst complex. The proportion of catalyst complex is generally equivalent to between about 0.001 and about 500 percent, and preferably between about 1 and about 100 percent by weight of the organic nitro compound. However, greater or lesser proportions may be employed if desired.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptene, cyclohexane, benzene, toluene, and xylene, and halogenated aliphatic and aromatic hydrocarbons such as dichloromethane, tetrachloroethane, trichlorofluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 2.0 and about 75 percent, but greater or lesser proportions may be employed if desired.

The order of mixing the reactants is not critical and may be varied within the limitations of the equipment employed. In one embodiment, the organic nitro compound, catalyst complex, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressures as well as provide reactant for the process, as the reaction progresses. If desired, additional carbon monoxide can be fed to the reactor either intermittently or continuously as the reaction progresses. The reaction is believed to progress in accordance with the following equation:

(I)     $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much faster, i.e. substantially instantaneous, and residence time may be substantially less than batch reaction.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can generally be obtained by employing a catalyst system which not only contains a noble metal isocyanide complex (I) of the type described above, but also contains a second component comprised of certain metal oxides. Oxides suitable as a second component of the catalyst system include at least one oxide of an element selected from the group consisting of vanadium, molybdenum, tungsten, niobium, chromium and tantalum, as described in copending U.S. patent application Ser. No. 619,158, filed Feb. 28, 1967, for Process, by Wilhelm J. Schnable, Ehrenfried H. Kober and Theodore C. Kraus. These elements are found in Groups V-A and VI-A of the Periodic Table. Suitable oxides of this type include chromic oxids ($Cr_2O_3$), chromium dioxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$) and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture. The proportion of the second component of the catalyst system, when one is employed, is generally equivalent to a weight ratio of the Group V-A or VI-A metal compound to the complex in the catalyst system generally in the range between about 0.0001:1 and about 25:1 and preferably in the range between about 0.005:1 and about 5:1.

The following examples further illustrate the method of this invention.

Example I

A mixture consisting of 2,4-dinitro-toluene (3 g., 27% by weight), and noble metal isocyanide complex $Rh(CNC_6H_5)_4Cl_3$ (1 g., 9% by weight) in 5 ml. of o-dichlorobenzene was charged into a 100 ml. rocking autoclave reactor. Carbon monoxide was charged into the reactor until a pressure of 6000 p.s.i.g. was obtained. The reactor was heated to a temperature of 190° C. for a period of 1.5 hours with constant rocking during the reaction. At the end of this period, carbon monoxide was released from the autoclave, the temperature was allowed to drop to ambient temperature, the mixture was removed from the autoclave and filtered. The liquid product as analyzed by vapor phase chromatography showed a yield of 31% of the product as isocyanate containing compounds.

Example II

The same method as in Example I was followed except that molybdenum trioxide ($MoO_3$) (0.011 g., 0.1% by weight) was used as a co-catalyst. The total yield of diisocyanate was 26%.

Example III

The same method as in Example I was followed except that the noble metal isocyanide complex used was $Rh(CNC_6H_4CH_3)_4(ClO_4)$ and the initial pressure of carbon monoxide was 2500 p.s.i.g. An isocyanate yield of 24% was obtained.

Example IV

The same method as Example I was followed except that the noble metal isocyanide complex used was $Pd(CNC_6H_4CH_3)_2Cl_2$ and the initial pressure of carbon monoxide was 2500 p.s.i.g. The yield of isocyanates was 30%.

Example V

The same method as Example I was followed except that the noble metal isocyanide complex used was $Rh(CNC_6H_4CH_3)_4(Cl_2)(ClO_4)$. The yield of isocyanate was 24%.

What is claimed is:

1. In a method for preparing an aromatic isocyanate by reacting an aromatic nitro compound with carbon monoxide at an elevated temperature and pressure in the presence of a catalyst, the improvement which comprises employing as said catalyst, a noble metal isocyanide complex having the formula:

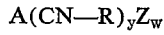

where A is a noble metal; R is an alkyl or aryl group having from 1 to 14 carbon atoms; Z is an anion selected from the group consisting of halides, $ClO_4^-$, $NCS^-$, $SCN^-$, $CN^-$, $NCO^-$ and $OCN^-$; $y$ is an integer of from 1 to 6 and $w$ is an integer of from 1 to 8.

2. The method of claim 1 wherein in said noble metal isocyanide complex A is a noble metal selected from the group consisting of palladium, rhodium, ruthenium, platinum, osmium and iridium.

3. The method of claim 2 wherein in said noble metal isocyanide complex, R is an aryl group containing from 6 to 10 carbon atoms, $y$ is 1 to 4 and $w$ is 1 to 4.

4. The method of claim 3 wherein in said noble metal isocyanide complex, Z is an anion selected from the group consisting of halides and $ClO_4^-$.

5. The method of claim 1 wherein a metal oxide selected from the group consisting of oxides of vanadium, molybdenum, tungsten, niobium, chromium and tantalum is used as a co-catalyst.

6. The method of claim 1 wherein the proportion of said catalyst is between about 0.001 and about 500 weight percent of said aromatic nitro compound.

7. The method of claim 6 wherein the proportion of said catalyst is between about 1 and about 100 weight percent of said aromatic nitro compound.

8. The method of claim 7 wherein said catalyst is selected from the group consisting of $Rh(CNC_6H_5)_4Cl_3$, $Rh(CNC_6H_4CH_3)_4(ClO_4)$, $Pd(CNC_6H_4CH_3)_2Cl_2$ and $Rh(CNC_6H_4CH_3)_4(Cl_2)(ClO_4)$.

9. The method of claim 7 wherein said catalyst is $Rh(CNC_6H_5)_4Cl_3$ and wherein a molybdenum trioxide co-catalyst is used.

10. The method of claim 7 wherein said aromatic nitro compound contains from 6 to 20 carbon atoms.

References Cited
UNITED STATES PATENTS

| | | | |
|---|---|---|---|
| 3,585,231 | 6/1971 | Hurley, Jr. et al. | 260—453 |
| 3,576,836 | 4/1971 | Prichard | 260—453 |

LEWIS GOTTS, Primary Examiner

D. H. TORRENCE, Assistant Examiner

U.S. Cl. X.R.

252—428, 429 A, 429 C, 431 R, 431 N